United States Patent [19]

Trevithick

[11] 4,301,482
[45] Nov. 17, 1981

[54] PROGRAMMABLE MULTI-CHANNEL AUDIO PLAYBACK SYSTEM FOR REEL-TO-REEL TAPES

[76] Inventor: Richard W. Trevithick, 1730 E. Woodside Dr., #37, Salt Lake City, Utah 84117

[21] Appl. No.: 42,994

[22] Filed: May 29, 1979

Related U.S. Application Data

[63] Continuation-in-part of Ser. No. 932,781, Aug. 11, 1978.

[51] Int. Cl.³ .............. G11B 27/22; G11B 27/30; G11B 15/18
[52] U.S. Cl. .............. 360/72.1; 360/72.2; 360/74.4; 369/32; 369/33
[58] Field of Search .......... 360/72.1, 72.2, 71, 360/73, 74.1, 74.4, 74.7; 179/100.1 VC, 100.1 PS, 100.1 C, 100.1 TC

[56] References Cited

U.S. PATENT DOCUMENTS

| | | | |
|---|---|---|---|
| 3,727,203 | 4/1973 | Crossman | 360/72.2 |
| 3,804,993 | 4/1974 | Honnold et al. | 179/100.1 PS |
| 3,893,177 | 7/1975 | Takenaka | 360/72.2 |
| 4,000,518 | 12/1976 | Stearns | 179/100.1 PS |
| 4,014,039 | 3/1977 | Yasunaga | 179/100.1 VC |
| 4,032,897 | 6/1977 | Pooley | 360/72.2 |
| 4,135,058 | 1/1979 | Pfost et al. | 179/100.1 VC |

OTHER PUBLICATIONS

L. C. Hobbs, Low Cost Tape Devices, Computer Magazine, pp. 21–29, Mar. 1976.

*Primary Examiner*—Alfred H. Eddleman
*Attorney, Agent, or Firm*—Thorpe, North, Western & Gold

[57] ABSTRACT

A programmable multi-channel audio playback system includes a reel-to-reel tape having recorded thereon a plurality of segments of information on multiple channels, with the segments being separated by gaps containing either no information or coded information identifying the gaps, control apparatus for causing the tapes to move and for controlling such movement, reading apparatus for reading the information segments from the tape as the tape is moved, speaker apparatus for producing audio sounds from the information segments read by the reading apparatus, a microprocessor responsive to input signals for signalling the control apparatus to control movement of the tape and for signalling the speaker apparatus to control production of the audio sounds, and a manually operable keyboard for generating input signals which are supplied to the microprocessor. By keying certain information on the keyboard, the microprocessor is programmed to cause the reading from the tape of selected information segments and the production of audio sounds therefrom. The information segments may be read from the tape in any order desired and only selected information segments need be read.

3 Claims, 6 Drawing Figures

FIG. 1
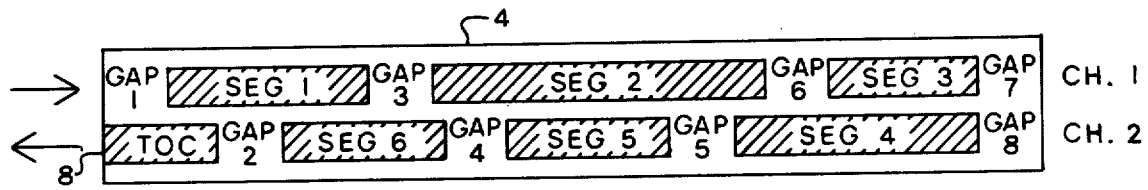
FIG. 2
| SEGMENT NUMBER | 1 | 2 | 3 | 4 | 5 | 6 |
|---|---|---|---|---|---|---|
| PRECEDING GAP NUMBER | 1 | 3 | 6 | 8 | 5 | 4 |
| FOLLOWING GAP NUMBER | 3 | 6 | 7 | 5 | 4 | 2 |
| CHANNEL | 1 | 1 | 1 | 2 | 2 | 2 |
FIG. 3
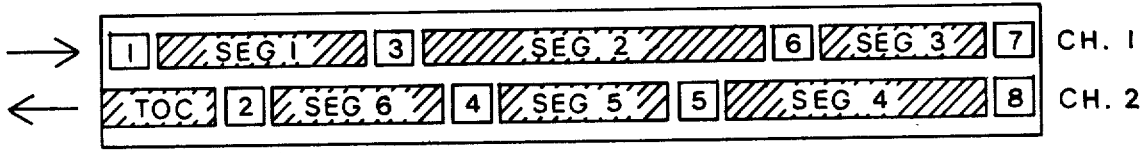
FIG. 5
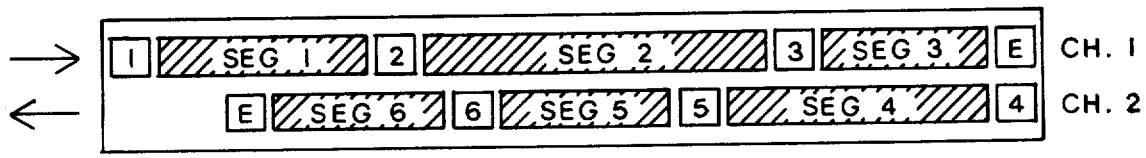

PROGRAMMABLE MULTI-CHANNEL AUDIO PLAYBACK SYSTEM FOR REEL-TO-REEL TAPES

BACKGROUND OF THE INVENTION

This is a continuation-in-part of application Ser. No. 932,781, filed Aug. 11, 1978.

This invention relates to a multi-track audio playback system adapted for use with a reel-to-reel tape and having manual controls by which a user may select for playback particular information segments stored on the tape. Commercially available multi-channel tape systems, such as are presently used in the home or installed in automobiles, play the musical numbers recorded on the tapes in the sequence in which the numbers are recorded unless the "change" or "select" button or knob is depressed. When such a button is depressed, the tape system moves from one channel to the next adjacent channel and commences to play back the musical selection located on the adjacent channel. Of course, when the tape system moves from one channel to another, it may commence playback of a selection in the middle, end, etc., of the selection. Some tape systems also provide a "fast forward" capability, but there is no way of knowing where the beginning and ending of a musical selection is—and so finding a particular desired musical number requires simple "trial and error" attempts using the "select" and "fast forward" buttons.

A number of so-called automatic tape selection systems have been proposed including that described in U.S. Pat. No. 4,014,039. In this system, programs are recorded on tapes so that a "silent" portion is located between each program. A keyboard panel is provided for supplying a desired number to a down counter which then counts downwardly from that number each time a silent portion on the tape is encountered during the fast forward movement of the tape. After a certain number of such silent portions are counted so that the downcounter reaches zero, the tape drive is stopped or returned to its normal playback speed so that the next program on the tape will be played. Of course, each time a user desires to skip some of the programs, he must key in an appropriate number and then cause the tape to move in the fast forward mode. That is, user intervention is required for each program that the user desires to hear out of order.

A unit on the market at present is the Sharp RT-3388. This unit can in some fashion locate specific segments on a single channel, but cannot relate locations of segments on one channel to those on other channels.

A type of automated audio tape information system is also disclosed in U.S. Pat. No. 3,804,993. In this system, a plurality of message segments are recorded on a tape with each message segment being separated by so-called markers and address information. When a particular message segment is to be played back, appropriate address input information is supplied and the system locates and reproduces the desired message segment. After the segment is reproduced, the tape recorder is stopped to allow the operator to take one of several actions. Again, this system requires operator intervention for each message segment which is to be reproduced out of order.

SUMMARY OF THE INVENTION

It is an object of the invention to provide a multi-channel audio playback system for use with reel-to-reel tapes in which certain ones of a plurality of programs recorded on the tapes may be chosen for playback by the user and then such programs will be automatically played (and replayed) without further intervention by the user.

It is another object of the invention to provide such a system in which, upon keying into the system certain information, the programs may be played back in any sequence desired by the user.

It is an additional object of the invention to provide such a system in which conventional reel-to-reel tape cassettes may be utilized.

It is also an object of the invention to provide such a system in which sequential searching for desired programs on multiple channel tapes is obviated.

It is a further object of the invention to provide a relatively simple and inexpensive audio playback system which may be manually programmed to automatically play back only selected programs recorded on a reel-to-reel tape.

The above and other objects of the invention are realized in one embodiment thereof which includes a two-channel reel-to-reel tape on which are serially recorded a plurality of information segments, with "silent" or coded gaps positioned between the segments. Also included is tape control and drive apparatus responsive to control signals for causing and controlling movement of the tape, reading apparatus for reading the information segments from the tape and for applying such information to an audio speaker system, a microprocessor for producing control signals for application to the tape drive and control apparatus and for signalling the speaker system to control audio reproduction of the information segments, and a keyboard device on which a user may manually key information identifying which information segments he desires to hear and the order in which he desires to hear the segments. The keyed information is received by the microprocessor which responds by producing control signals to indicate to the tape control and drive apparatus the manner in which the tape is to be moved to locate the selected information segments. Control signals are also produced by the microprocessor to indicate to the speaker system the times during which the speaker system is to reproduce the information applied to it by the reading apparatus. The information keyed on the keyboard is maintained in storage by the microprocessor to continue control of the operation of the system until new information is keyed. That is, the selected information segments are repeatedly reproduced until new information is keyed on the keyboard directing the microprocessor to cause the reproduction of different information segments. The microprocessor may also be "programmed" to reproduce the information in any sequence desired by the user. The invention may be used with either multiple or single read head audio systems.

BRIEF DESCRIPTION OF THE DRAWINGS

The above and other objects, features and advantages of the present invention will become apparent from a consideration of the following detailed description presented in connection with the accompanying drawings in which:

FIG. 1 is a diagrammatic showing of a two-channel reel-to-reel tape having a plurality of information segments stored thereon;

FIG. 2 is a table identifying different parameters about each information segment shown on the diagrammatic tape of FIG. 1;

FIG. 3 is a diagrammatic showing of a two-channel reel-to-reel tape whose information segments are separated by areas having coded multifrequency tones;

FIG. 5 is a diagrammatic showing of another two channel reel-to-reel tape having a plurality of information segments stored thereon.

DETAILED DESCRIPTION

Figure 4:
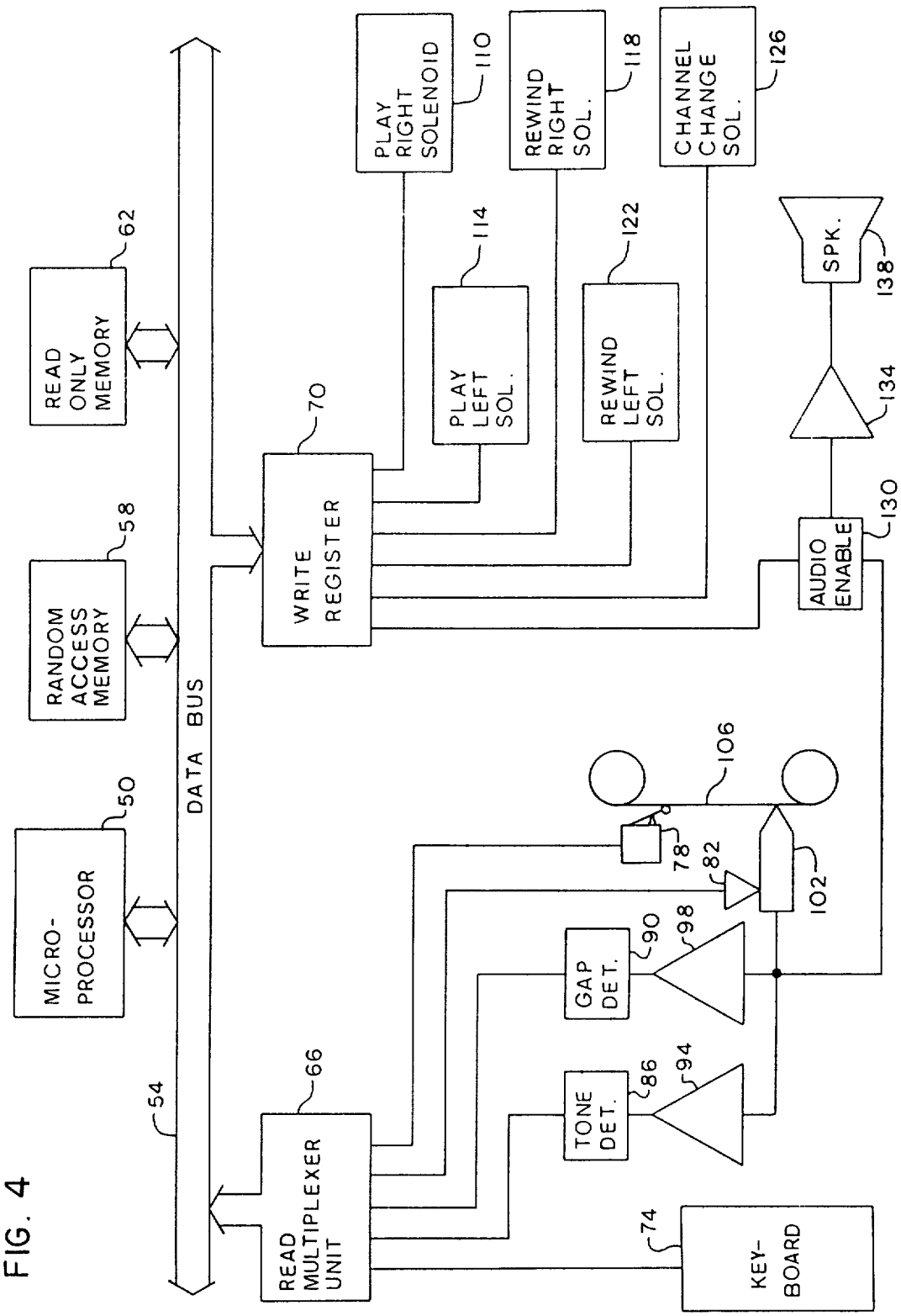
FIG. 4 is a schematic diagram of multi-channel audio playback system for use with reel-to-reel tapes of the type shown in FIGS. 1 and 3.

Referring to FIG. 1, there is shown diagrammatically a reel-to-reel tape 4 having two parallel channels or tracks. This tape is the conventional cassette type used in commercial audio equipment, except for the table of contents (TOC) portion 8 which will be discussed momentarily. It should be understood that for the width of the tape 4 shown in FIG. 1, the tape would be much longer than shown; FIG. 1 is for illustration only.

As already noted, there are two channels, identified as "CH. #1" (channel 1) and "CH. #2" (channel 2), positioned in parallel on the tape 4. Recorded on each channel are one or more information segments or portions of information segments. For example, on channel 1, information segments 1, 2 and 3 are recorded. The information segments are recorded (and numbered in FIG. 1) in a serial fashion from left to right for channel 1 and from right to left for channel 2 so that as the tape is "played back", the information segments would be reproduced and broadcast in consecutive order in accordance with their serial position on the tape. Separating each information segment is a gap in the channel in which no information is recorded. The information segments generally are of different lengths, but this of course depends upon the amount of information recorded in the segments.

The tape 4 of FIG. 1 includes six information segments and eight gaps, with the gaps being numbered in ascending order as they are encountered (regardless of which channel) moving from the left end of the tape to the right end. In a portion of channel 2 at the end thereof is recorded a table of contents (TOC) 8 which contains information as to the location of each of the information segments, i.e., what channel each information segment is located, and what gap precedes and succeeds each information segment. This information, which is shown in table form in FIG. 2, may be recorded as multi-frequency tones which can be read and decoded into numbers representing the desired information.

As shown in FIG. 2, each of the recorded information segments is listed in the first column followed by a column showing the preceding gap number and then a column showing the succeeding gap number. The final column shows the channel on which each of the segments is located.

FIG. 3 is another embodiment of a two-channel reel-to-reel tape which is different from the FIG. 1 embodiment in that the information segments are separated by segments of coded multifrequency tones. The tones are coded to identify the gap number relative to the left end of the tape. Providing such tones in the gaps increases the certainty of locating the gaps when searching for the information segments and also reduces the processing requirements for finding an information segment, as will be discussed in greater detail later.

FIG. 4 is a block diagram arrangement of a multi-channel audio playback system which may be used with reel-to-reel tapes of the type shown in either FIG. 1 or FIG. 3. The system includes a microprocessor 50 which controls the operation of the other components of the system. Such control is effected by receipt of and transmission of signals over a data bus 54. Coupled to the data bus 54 is a random access memory 58 for use by the microprocessor for temporary storage of data and for storing the table of contents information shown in FIG. 2, and a read only memory 62 which contains programs for controlling system operation. The configuration of a microprocessor 50, random access memory 58, and read only memory 62 as shown is conventional. The microprocessor 50 could illustratively be a Zilog Z-80 made by Zilog Corporation.

Also coupled to the data bus 54 is a read multiplexer unit 66 and a write register 70. The read multiplexer unit 66 receives information from a plurality of different units (to be discussed hereafter), and supplies such information in a multiplexed fashion to the data bus 54 for transfer to the microprocessor 50 or the random access memory 58. The units connected to the read multiplexer unit 66 include a manually operable keyboard 74, a tape tension detection switch 78, a microswitch 82, a tone detector 86 and a gap detector 90. Amplifiers 94 and 98 amplify signals received from a read head 102 for application respectively to the tone detector 86 and gap detector 90. The read head is a conventional monaural, single-channel read head which is maintained in continual contact with or close proximity to an endless tape 106. The detector switch 78 is maintained in constant contact with the tape for detecting when the tape becomes taut (indicating the end of the tape). When the tape is being played, it is not taut so that the switch 78 is not operated. The read head 102 is positionable by a channel change solenoid 126 to read information stored on either of the two channels included on the endless tape 106. These elements are conventional for a tape player system.

The write register 70 receives information from the microprocessor 50 via the data bus 54 to control the operation of a play right solenoid 110, a play left solenoid 114, a rewind right solenoid 118, a rewind left solenoid 122, the channel change solenoid 126, and an audio enable circuit 130. The write register could illustratively be a decoder for supplying a signal to a selected one of the solenoids or the audio enable circuit in response to data from the microprocessor. When the play right solenoid 110 is signalled by the write register 70, it causes the tape 106 to move to the right at the normal play speed. When the write register 70 signals the play left solenoid 114, this solenoid causes the tape 106 to move to the left at the normal play speed. When the write register 70 signals the rewind right or rewind left solenoids 118 and 122, these solenoids cause the tape 106 to move at a faster than normal speed to the right and left respectively. When the write register signals the channel change solenoid 126, the channel change solenoid, as indicated earlier, causes the read head 102 to change channels on the tape. Finally, the audio enable circuit 130, when signalled by the write register 70, allows passage of signals from the read head 102 to an amplifier 134 which amplifies the signals and applies them to a speaker 138 which will reproduce the signals for listening by the user. The audio enable circuit 130 could illustratively be a transistor or similar triode control device.

In operation, when a user desires to play a particular tape such as that depicted in FIG. 1, he inserts the tape into a conventional tape receptacle so that the tape is positioned adjacent the read head 102 and the switch 78. Such a tape would contain the table of contents section earlier described in connection with FIGS. 1 and 2. When the system is turned on, i.e., when power is supplied to the microprocessor 50, it applies a signal to the write register 70 to cause the write register to operate the channel change solenoid 126. In response, the channel change solenoid causes the read head to move to channel 2 (or stay on channel 2 if it is already there). When the read head 102 is at channel 2, it is out of contact with the microswitch 82 and a signal indicating this is applied to the read multiplexer unit 66 which, in turn, applies the signal to the microprocessor 50 via the data bus 54. The microprocessor 50 then signals the write register 70 to activate the rewind left solenoid 122. The rewind left solenoid causes the tape 106 to move to the left until the end of the tape is detected by the tape tension detection switch 78. When this occurs, the switch 78 applies a signal to the read multiplexer unit 66 which in turn applies it to the microprocessor 50. The microprocessor then applies a signal to the write register 70 to activate the play right solenoid 110. The play right solenoid, in turn, causes the tape 106 to move right in its normal play mode and the read head 102 reads the information stored in the table of contents segment on the tape which, as indicated earlier, consists of different combinations of tones. This information is applied by the read head 102 to the amplifier 94 which amplifies the signals for application to the tone detector 86. The tone detector 86 then produces a sequence of signals representing the detected tones for application to the read multiplexer unit 66. These signals are then applied to the data bus and stored in the random access memory 58. After reading out the table of contents from the tape, the read head 102 encounters gap 2 on channel 2, and this is detected by the gap detector 90 which accordingly signals the read multiplexer unit 66. The read multiplexer unit 66 applies this signal to the data bus 54 and to the microprocessor 50 which then signals the write register 70 to deactivate the play right solenoid 118. The movement of the tape is thus halted at gap 2 in channel 2. The system is now in condition for being "programmed" by the user to play the selected information segments.

The user keys in on the keyboard 74 an indication of the information segments which he desires to have played back. The keyboard 74 could be a conventional push button type keyboard in which a different signal is applied to the read multiplexer unit 66 for each key depressed. Each of the keys on the keyboard would be used to identify a different one of the information segments on a tape so that when any key was pushed, a signal would be applied to the multiplexer 66 and then to the microprocessor 50 to indicated that that information segment is to be played.

Assume that a user has keyed in information indicating that he desires to play segments 1, 2, 5 and 6. These information segments may be played back in numerical sequence or in the sequence in which the keys representing the different information segments are depressed. If it is desired to play the segments in numerical sequence (i.e., 1, 2, 5 and 6), then the microprocessor 50 simply plays back each segment beginning with segment 1 and at the end of playback of a segment, determines the channel and the number of gaps to count to reach the next segment. The information as to the number of gaps to count and the channel on which the segment is located can be computed from the table of contents which is already stored in random access memory 58. Thus, for the segments in question, the read head 102 would be changed to channel 1 and then would be rewound left until gap 1 were encountered. Then the tape would be moved right at the play speed to play segment 1 followed by segment 2. After that, the read head 102 would be positioned at gap 6 following segment 2. To reach segment 5, the tape would be rewound right to the end of the tape, the read head would be moved to channel 2, and the tape would be moved in the rewind left mode until gap 5 on the channel was encountered. Segment 5 would then be read from the tape until gap 4 were reached. Segment 6, since it follows segment 5, would next be played back after which the read head would be positioned at gap 2 following segment 6 in channel 2.

Since, upon programming the system to play a particular group of information segments, the system continues to play such segments until "reprogrammed", after segment 6 were read back, the system would next return to the beginning of segment 1. This would be done by changing the read head to channel 1 and rewinding left until gap 1 were encountered. After this occurred, the tape would be moved in the play right mode to play back segment 1, etc.

If the segments are to be played back in the sequence in which the corresponding keys are depressed, then the microprocessor simply stores information identifying this sequence in the same fashion that it would search in numerical sequence.

Exemplary circuitry for the keyboard 74, multiplexor 66, tone detector 86 and gap detector 90 is disclosed in the aforecited application of which this is a continuation-in-part. It is apparent that various specific implementations of the units of FIG. 4 could be provided.

For use with the tape represented in FIG. 3, the FIG. 4 system need not include the gap detector 90 and amplifier 98. This is because each gap is identified by coded multi-frequency tones. To locate a particular information segment on the FIG. 3 tape (assuming that the table of contents has been read by the microprocessor 50), the system simply switches to the channel on which the segment is located and then moves the tape in a rewind left mode, if the preceding gap number of the desired segment is less than the current gap location, or a rewind right mode, if the preceding gap number of the desired segment is greater than the current gap number. The tape is moved until the multi-frequency tone of the desired gap location is detected. Of course, if the desired gap location is the same as the current gap location, then no tape movement is necessary. After the desired gap is found, the system plays back the desired segment in the proper direction (right for channel 1 and left for channel 2) until the multi-frequency tone which follows the desired segment is encountered. Since the gaps are coded, counting of gaps is unnecessary and this expedites the finding of desired information segments.

FIG. 5 shows an alternative arrangement of a reel-to-reel tape in which six information segments are recorded on two different channels or tracks. This recording arrangement is similar to that of FIG. 3 except that the multi-frequency tone segments separating the information segments are coded to identify the next following information segment, and no table of contents is included. Also, multi-frequency tone segments E represent the "end of the channel". This tape arrangement is designed for use with a multiple read-head playback system such as that shown in FIG. 6.

Figure 6:
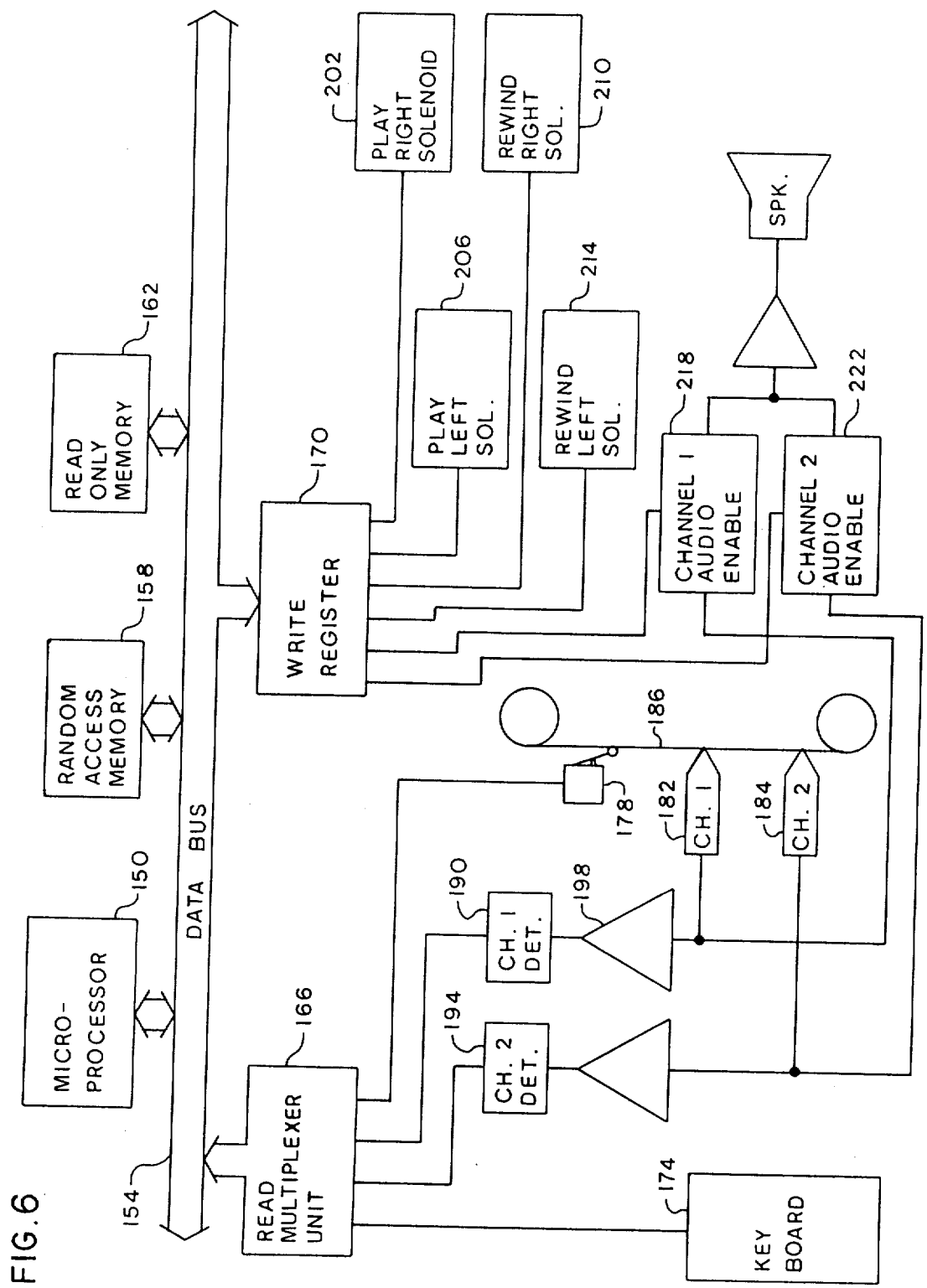
FIG. 6 is a schematic diagram of a playback system for playing back information from a tape of the type shown in FIG. 5.

Many of the components of the FIG. 6 system are the same as those of the FIG. 4 system with the following exceptions: an additional read head, amplifier, tone detector and audio enable circuit are provided in the FIG. 6 arrangement, and no channel change solenoid is provided in this arrangement. Also, the gap detector has been eliminated.

As with the FIG. 4 system a microprocessor 150 controls the operation of the other components of the system through receipt of the transmission of signals over a data bus 154, and pursuant to programs contained in a read only memory 162. A random access memory 158 is provided for the temporary storage of information by the microprocessor 150. The other components of the FIG. 6 system will be discussed when describing the operation of the system.

When a tape 186 is placed in the receptacle of the system and the power is turned on, the microprocessor 150 signals a rewind left solenoid 214 via a write register 170 to rewind the tape 186 to gap 1 preceding segment 1. A channel 1 read head 182 would supply the gap 1 tones to a channel 1 tone detector 190 via an amplifier which would then supply a signal to the read multiplexer unit 166 and ultimately to the microprocessor 150 which would stop the rewind operation.

The desired segments to be played back may now be selected by appropriate keying of a keyboard 174. The keyed information is supplied via the read multiplexer unit 166 to the microprocessor 150. In response, the microprocessor 150 signals the rewind right solenoid 210 to cause the tape to move to the right and as it is moving, both channels are monitored by the microprocessor 150 to find the multi-frequency tone segment which precedes the segment to be first played. If this tone segment is in channel 1, as soon as the tone segment is detected, the microprocessor 150 signals the play right solenoid 202 to cause the tape to move so that the selected segment is played back. If the tone segment is in channel 2, then the microprocessor 150 signals to play left solenoid 206 to cause the tape to move to the left to play the selected segment. Reproduction of the audio information is carried out the same as described for FIG. 4, with the appropriate one of audio enable circuits 218 or 222 being enabled depending upon which channel contains the desired segment. Playback continues until a multi-frequency tone is encountered which is both greater than the number of the segment being played back and is detected on the same channel as the segment being played back. (It should be noted that the "E" segment at the end of each channel is greater than any number encountered.) Detection during playback of a tone which meets these conditions causes the microprocessor 150 to stop the tape 186 by signalling whichever one of the play solenoids has been activated. The value of the last detected tones on each channel is stored in random access memory for use as next described.

To locate the next desired segment, the system determines whether the desired segment is toward the left or right end of the tape, as follows:

1. If the desired segment is numerically less than the last tone detected on channel 1, then the desired segment will be found toward the left end of the tape.

2. If the desired segment is numerically greater than the last tone detected on channel 2, then the desired segment will also be found toward the left end of the tape.

3. If the desired segment is both greater than the last tone detected on channel 1, and less than the last tone detected on channel 2, then the desired segment will be found toward the right end of the tape.

4. If the desired segment equals the last tone encountered on channel 1 or channel 2 and if the tape was moving toward the right when the tone was encountered, then the desired segment will be found toward the left end of the tape. If the desired segment equals the last tone encountered on channel 1 or channel 2 but the tape was moving to the left when the tone was encountered, then the desired segment will be found toward the right end of the tape.

Based on the above determination, the system simply moves the tape to the left or right as necessary, constantly monitoring both channels until the desired segment is located; that segment is then played back, etc.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A programmable multi-channel audio playback system for tape cassettes and the like comprising an end-to-end tape means having two or more channels on which a plurality of segments of information are serially recorded in one direction on a first channel and in the opposite direction on a second channel, each serially adjacent pair of segments being separated by a gap, and each end of the tape means including a gap for each channel, said tape means further having recorded thereon a table of contents which includes information identifying each segment of information recorded on the tape means, information identifying the gaps preceding and succeeding each segment of information, and information identifying which channel each segment of information is on, reading means for reading information from the tape means as the tape means is moved, audio speaker means for aurally reproducing information segments applied thereto when activated by an activation signal, keyboard means having a plurality of manually operable keys which, when operated, cause production of key signals, said key signals identifying information segments on the tape means which are to be reproduced, storage means for temporarily storing said key signals, means coupled to said reading means for producing a gap indication signal when said reading means encounters a gap on said tape means, means for supplying said gap indication signals to said microprocessor, a microprocessor responsive to said key signals, to the table of contents read from the tape means, and to said gap indication signals for producing control signals to control movement of the tape means, and for producing activation signals for activating said audio speaker means, and control means for causing the tape means to move and for controlling such movement in response to control signals, said control means including first direction play means responsive to control signals from said microprocessor for causing said tape means to move at a playback speed in said first direction, second direction play means responsive to control signals from said microprocessor for causing said tape means to move at a playback speed in said second direction, first rewind means responsive to control signals from said microprocessor for causing said tape means to move at a faster than playback speed in said first direction, second rewind means responsive to control signals from said microprocessor for causing said tape means to move at a faster than playback speed in said second direction, and means responsive to control signals from said microprocessor for causing said reading means to read information segments from either the first or second channel and for causing said audio speaker means to reproduce information segments from either the first or second channel.

2. A programmable multi-channel audio playback system for tape cassettes and the like comprising an end-to-end tape means having two or more channels on which segments of information are serially recorded in one direction on a first channel and in the opposite direction on a second channel, each serially adjacent pair of segments being separated by a gap, said tape means further including information recorded in said gaps for identifying the position of each gap relative to one end of the tape means, and a table of contents which includes information identifying each segment of information recorded on the tape means, information identifying the gaps preceding and succeeding each segment of information, and information identifying which channel each segment of information is on, reading means for reading said information segments, the table of contents and the information contained in the gaps from said tape means, audio speaker means for aurally reproducing information segments applied thereto when activated by an activation signal, keyboard means having a plurality of manually operable keys which, when operated, cause production of key signals, said key signals identifying information segments on the tape means which are to be reproduced, storage means for temporarily storing said key signals, a microprocessor responsive to said key signals, said table of contents, and the information contained in the gaps for producing control signals for application to said control means to control movement of the tape means, and for producing activation signals for activating audio speaker means, and control means for causing the tape means to move and for controlling such movement in response to control signals, said control means including first direction play means responsive to control signals from said microprocessor for causing said tape means to move at a playback speed in said first direction, second direction play means responsive to control signals from said microprocessor for causing said tape means to move at a playback speed in said second direction, first rewind means responsive to control signals from said microprocessor for causing said tape means to move at a faster than playback speed in said first direction, and second rewind means responsive to control signals from said microprocessor for causing said tape means to move at a faster than playback speed in said second direction, and means responsive to control signals from said microprocessor for causing said reading means to read information segments from either the first or second channel and for causing said audio speaker means to reproduce information segments from either the first or second channel.

3. A programmable multi-channel audio playback system for tape cassettes and the like comprising an end-to-end tape means having two or more channels on which segments of information are serially recorded in one direction on a first channel and in the opposite direction on a second channel, each serially adjacent pair of segments being separated by a gap, said tape means further including information recorded in each of said gaps for identifying the information segment following each gap, reading means for reading said information segments from the tape means, and the information contained in the gaps, audio speaker means for aurially reproducing information segments applied thereto when activated by an activation signal, keyboard means having a plurality of manually operable keys, which, when operated, cause production of key signals, said key signals identifying information segments on the tape means which are to be reproduced, storage means for temporarily storing said key signals, a microprocessor responsive to said key signals and to the information contained in the gaps for producing control signals, and for producing activation signals for activating said audio speaker means, and control means for causing the tape means to move and for controlling such movement in response to control signals, said control means including first direction play means responsive to control signals from said microprocessor for causing said tape means to move at a playback speed in said first direction, second direction play means responsive to control signals from said microprocessor for causing said tape means to move at a playback speed in said second direction, first rewind means responsive to control signals from said microprocessor for causing said tape means to move at a faster than playback speed in said first direction, and second rewind means responsive to control signals from said microprocessor for causing said tape means to move at a faster than playback speed in said second direction, means responsive to control signals from said microprocessor for causing said reading means to read information segments from either or both the first and second channel and for causing said audio speaker means to reproduce information segments from either the first or second channel.

* * * * *